United States Patent [19]
Ophardt et al.

[11] Patent Number: 5,591,240
[45] Date of Patent: Jan. 7, 1997

[54] POWDER PAINT BOOTH BACKFLOW FILTER APPARATUS

[76] Inventors: Hermann Ophardt, Lindenau 27, Issum, Germany, D-47661; Heiner Ophardt, 4743 Christie Dr., Beamsville, Ontario, Canada, L0R 1B0

[21] Appl. No.: 425,502

[22] Filed: Apr. 20, 1995

[30] Foreign Application Priority Data

Jun. 27, 1994 [CA] Canada ................... 2126802

[51] Int. Cl.⁶ ................................. B01D 46/00
[52] U.S. Cl. .............. 55/217; 55/287; 55/288; 55/302; 55/DIG. 46; 95/279; 118/326
[58] Field of Search ............... 55/217, 284, 286, 55/287, 288, 293, 302, DIG. 46; 118/326, 621; 95/279, 280

[56] References Cited

U.S. PATENT DOCUMENTS

| | | |
|---|---|---|
| 231,376 | 8/1880 | Thayer . |
| 326,176 | 9/1885 | Van Gelder . |
| 1,336,600 | 4/1920 | Tuttle ................... 55/287 |
| 1,348,966 | 8/1920 | Smith ................... 55/303 |
| 1,356,086 | 10/1920 | Plaisted ................ 55/303 |
| 1,493,110 | 5/1924 | Diehl ................... 55/303 |
| 1,729,527 | 9/1929 | Titgen .................. 55/303 |
| 2,526,651 | 10/1950 | Garbo .................. 55/303 |
| 3,173,980 | 3/1965 | Hysinger ............... 55/217 |
| 3,608,278 | 9/1971 | Greenspan ............. 55/212 |
| 3,849,091 | 11/1974 | Peterson ............... 55/302 |
| 3,868,238 | 2/1975 | Mills, Jr. et al. ....... 55/288 |
| 3,905,785 | 9/1975 | Fabre .................. 55/303 |
| 3,930,803 | 1/1976 | Winter ................. 55/288 |
| 4,161,389 | 7/1979 | Staffin et al. . |
| 4,227,900 | 10/1980 | Nichols et al. .......... 55/287 |
| 4,364,749 | 12/1982 | Dunseith ............... 55/288 |
| 4,372,713 | 2/1983 | Kean, Jr. .............. 406/172 |
| 4,409,009 | 10/1983 | Lissy . |
| 4,571,771 | 2/1986 | Worwa ................. 55/217 |
| 4,778,491 | 10/1988 | Yow, Sr. ............... 55/283 |
| 5,108,473 | 4/1992 | Hayden, Sr. ........... 55/302 |
| 5,174,797 | 12/1992 | Yow, Sr. et al. ........ 55/283 |
| 5,217,509 | 6/1993 | Jansen ................. 55/283 |
| 5,261,934 | 11/1993 | Shutic et al. .......... 55/302 |

FOREIGN PATENT DOCUMENTS

| | | |
|---|---|---|
| 729415 | 8/1969 | Belgium . |
| 2181396 | 11/1973 | France . |
| 2251425 | 4/1974 | Germany ............... 55/287 |
| 939040 | 6/1982 | U.S.S.R. ............... 55/287 |
| 332601 | 7/1930 | United Kingdom ....... 55/287 |
| 812755 | 4/1959 | United Kingdom . |

*Primary Examiner*—C. Scott Bushey
*Attorney, Agent, or Firm*—Riches, McKenzie & Herbert

[57] ABSTRACT

A novel filtering apparatus particularly adapted for a transportable, modular powder spray painting booth with backflow cleaning capability by having two sets of filters each associated with a separate output chamber such that in normal use, a vacuum draws air from the paint booth through both filters and in backflow use, the same vacuum draws air through one filter in a normal filtering manner but with the air first drawn through the other filter in a backflow manner.

19 Claims, 8 Drawing Sheets

POWDER PAINT BOOTH BACKFLOW FILTER APPARATUS

SCOPE OF THE INVENTION

This invention relates to a filtering apparatus with backflow cleaning capability and more particularly to a filtering apparatus for powder painting booths.

BACKGROUND OF THE INVENTION

Electrostatic powder coating is well known. In such painting, paint powder is sprayed onto an article to be painted. Due to the article and the paint particles having different electrical potential as by one or the other being charged, the paint powder particles adhere to the article, coating it. The article is then moved to, for example, an oven where by baking, the paint powder particles are fixed into a continuous paint coating.

The article is sprayed with the paint powder in a paint booth which permits over spray of paint powder to be collected and re-sprayed. To keep the paint powder in the paint booth and collect the paint powder, paint booths are kept under a partial vacuum as, by drawing air with a relatively large capacity fan from the booth through filters which collect the over-spray paint powder. Paint powder caught in the filter may by gravity fall from the filters into a paint powder collection hopper. To assist in unclogging of the filters and dislodge paint powder therefrom, it is known to periodically pass air under pressure backwards through the filters. Such backflow cleaning with pressurized air has a number of disadvantages. Firstly, to provide air under pressure requires a compressor which is expensive and bulky. The inventor has appreciated that the use of a compressor is especially disadvantageous where a number of modular paint booths are desired for easy substitution and either a compressor is required for each module or connections to a central compressors must be made to switch modules. Secondly, subjecting the filters to strong pressure differentials between the vacuum on one hand and the above atmosphere pressure on the other hand causes a loud noise or pop which is startling and disturbing to paint booth operators. Thirdly, it is believed that to have a strong pressure differential between a vacuum condition and a pressurized condition unduly stresses the filters and reduces their life.

SUMMARY OF THE INVENTION

Accordingly, to at least partially overcome these disadvantages of the prior art, the present invention provides a novel filtering apparatus with backflow cleaning capability by having two sets of filters each associated with a separate output chamber such that in normal use, a vacuum draws air from the paint booth through both filters and in backflow use, the same vacuum draws air through one filter in a normal filtering manner but with the air drawn through the other filter in a backflow manner.

An object of the present invention is to provide a simplified filtering apparatus capable of backflow cleaning.

Another object is to provide a simplified or more compact filtering apparatus capable of backflow cleaning for a powder paint booth.

Another object is to provide a novel method of operating a filtering apparatus so as to provide cycles of normal operation and cycles of backflow cleaning operation.

Accordingly, in one aspect, the present invention provides a filtering apparatus with backflow cleaning capability comprising:

power paint booth chamber means open to atmosphere, intake chamber means, first output chamber means, second output chamber means, vacuum means, the intake chamber means having inletway means with connecting the intake chamber means to the paint booth chamber means with inlet valve means operable to permit or prevent flow through the inletway means into the intake chamber means, first exitway means connecting the intake chamber means to the first output chamber means, first paint powder filter means in the first exitway means between the intake chamber means and the first output chamber means, second exitway means connecting the intake chamber means to the second output chamber means, first paint powder filter means in the second exitway means between the intake chamber means and the second output chamber means, paint powder collection means disposed in association with the first and second filter means to collect paint powder discharged therefrom, first vacuum plenum means connecting the first output chamber means to the vacuum means, first vacuum valve means operable to permit or prevent flow through the first vacuum plenum means from the first output chamber means, second vacuum plenum means connecting the second output chamber means to the vacuum means, second vacuum valve means operable to permit or prevent flow through the second vacuum plenum means from the second output chamber means, first air duct means connecting the first output chamber means to a source of air at a pressure above pressure drawn by the vacuum means, first air valve means operable to permit or prevent flow through the first air duct means to the first output chamber means, second air duct means connecting the second output chamber means to a source of air at a pressure above pressure drawn by the vacuum means, second air valve means operable to permit or prevent flow through the second air duct means to the second output chamber means.

In another aspect, the present invention resides in a filtering apparatus for filtering particulate matter entrained in gas with backflow cleaning capability comprising, collection chamber means for collecting said particulate matter, the collection chamber means including first outlet means and second outlet means, vacuum means for evacuating said collection chamber means to a negative pressure, particulate matter filtration means comprising first filter means across said first outlet means and second filter means across said second outlet means, first conduit means including first conduit valve means operable to selectively connect the first outlet means to either:

(a) said vacuum means, whereby said vacuum means draws gas outwardly from said collection chamber means through said first filter means via said first outlet means, or (b) a first source of gas source at a pressure above pressure drawn by said vacuum means, whereby the first conduit means permits gas from the first source of gas to backflow into the collection chamber means through the first filter means via said first outlet means, second conduit means including second conduit valve means operable to selectively connect the second outlet means to either:

(a) said vacuum means, whereby said vacuum means draws gas outwardly from said collection chamber means through the second filter means via the second outlet means, or (b) a second source of gas at a pressure above pressure drawn by the vacuum means, whereby the second conduit means permits gas from the second source of gas to backflow into the collection chamber means through the second filter means via said second outlet means.

In another aspect, the present invention resides in a paint powder apparatus with filtering and backflow cleaning capability comprising, housing chamber means for housing an article to which said powder is to be applied, collection chamber means for collecting excess powder, the collection chamber means in communication with the housing chamber means by an inletway means and including first outlet means and second outlet means, inlet valve means operable to either permit or prevent air and said powder to flow from the housing chamber means through the inletway means into the collection chamber means, vacuum means for evacuating said collection chamber means to a negative pressure, powder filtration means comprising first filter means across said first outlet means and second filter means across said second outlet means, first conduit means including first conduit valve means operable to selectively connect the first outlet means to either:

(a) said vacuum means, whereby said vacuum means draws air outwardly from said collection chamber means through said first filter means via said first outlet means and powder entrained by said air is retained on said first filter means, or (b) air at a pressure above pressure drawn by said vacuum means, whereby the first conduit means permits air to backflow into the collection chamber means through the first filter means via said first outlet means to dislodge powder retained on said first filter means, second conduit means including second conduit valve means operable to selectively connect the second outlet means to either:

(a) said vacuum means, whereby said vacuum means draws air outwardly from said collection chamber means through the second filter means via the second outlet means and powder entrained by said air is retained on said second filter means, or (b) air at a pressure above pressure drawn by the vacuum means, whereby the second conduit means permits air to backflow into the collection chamber means through the second filter means via said second outlet means to dislodge powder retained on said second filter means.

In a further aspect, the present invention resides in a method of backflow cleaning a powder filtering apparatus having backflow cleaning capability and which comprises, collection chamber means for collecting said powder, the collection chamber means having inletway means for permitting gas and powder to flow therein, first outlet means and second outlet means, vacuum means for evacuating said collection chamber means to a negative pressure, powder filtration means comprising first filter means across said first outlet means and second filter means across said second outlet means, first conduit means including first conduit valve means operable to selectively connect the first outlet means to either:

(a) said vacuum means, whereby said vacuum means draws gas outwardly from said collection chamber means through said first filter means via said first outlet means, or (b) a first source of gas at a pressure above pressure drawn by said vacuum means, whereby the first conduit means permits gas from the first source of gas to backflow into the collection chamber means through the first filter means via said first outlet means, second conduit means including second conduit valve means operable to selectively connect the second outlet means to either:

(a) said vacuum means, whereby said vacuum means draws gas outwardly from said collection chamber means through the second filter means via the second outlet means, or (b) a second source of gas at a pressure above pressure drawn by the vacuum means, whereby the second conduit means permits gas from the second source of gas to backflow into the collection chamber means through the second filter mans via said second outlet means, said method comprising the steps of:

operating said vacuum means with said apparatus in a first backflow configuration wherein, said first conduit valve means connects said first outlet means to said vacuum means to draw said gas outwardly from said collection chamber means through said first filter means, and retain powder entrained by said gas on said first filter means, and said second conduit valve means connects said second outlet means to said second conduit gas source whereby air backflows into the collection chamber means through the second filter means to dislodge powder retained thereon, and operating said vacuum means with apparatus in a second backflow configuration wherein, said second conduit valve means connects said second outlet means to said vacuum means to draw said gas outwardly from said collection chamber means through said second filter means, and retain powder entrained by said gas on the second filter means, and said first conduit valve means connects said first outlet means to said first conduit gas source whereby air backflows into the collection chamber means through the first filter means to dislodge powder retained thereon.

BRIEF DESCRIPTION OF THE DRAWINGS

Further aspects and advantages of the present invention will become apparent from the following description taken together with the accompanying drawings in which:

FIGS. 4, 5 and 6 are partial views of the apparatus of FIG. 2 illustrating a normal filtering configuration and, in which FIG. 5 illustrates a cross-sectional view through the filters along section line V—V' of FIG. 4;

DETAILED DESCRIPTION OF THE DRAWINGS

Figure 1:
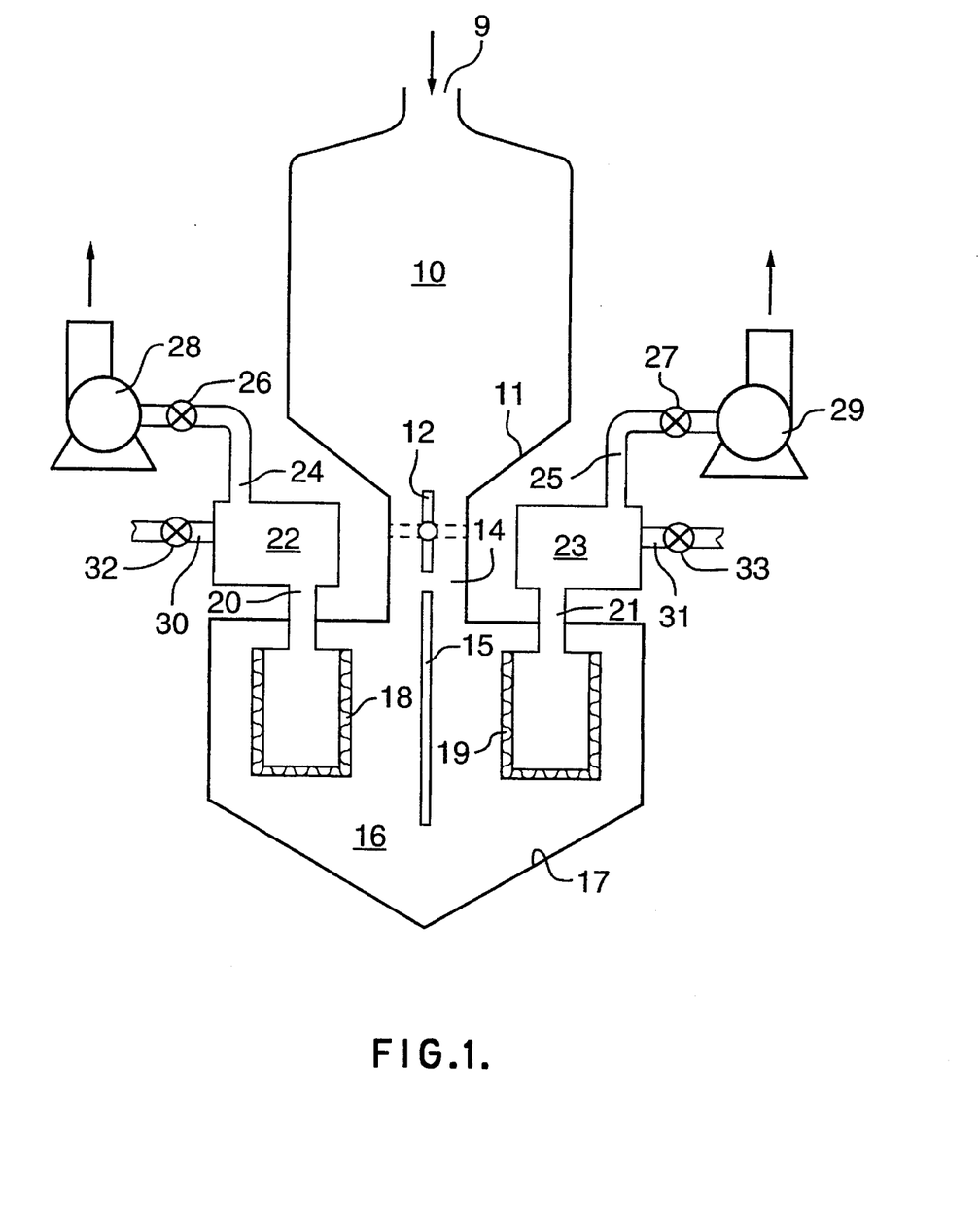
FIG. 1 is a schematic flow diagram illustrating a simplified form of a filtering apparatus in accordance with a first embodiment of the present invention.

Reference is made first to the schematic flow diagram of FIG. 1.

FIG. 1 shows a paint booth or housing chamber 10 in which an article to be sprayed with paint powder is housed. The chamber is configured to assist in containing over-spray of powder. Chamber 10 is schematically illustrated as open at opening 9 to the atmosphere, however, may equally be provided as a closed chamber with or without a separate positive pressure gas source. Chamber 10 has a powder funnel hopper portion 11 to assist in collecting over-spray powder and directing it together with drawn air through an inletway 14 into a collection or intake chamber 16. An inlet valve is located in inletway 14 and is activatable between an open configuration shown in solid line and permitting flow from the chamber 10 to the chamber 16 and a closed configuration shown in dotted lines to prevent flow through the inletway 14. Inlet valve 12 is preferably shown as a damper-like flap.

A first exitway 20 extends as a part of a conduit system from a first outlet in the chamber 16 and provides an exit from chamber 16 to a first output chamber 22. A first filter 18 is disposed about the first exitway 20 to require air passing between chambers 16 and 22 to flow through the first filter 18. The first output chamber 22 has a first vacuum plenum 24 connecting the chamber 22 to a first vacuum source 28. A first vacuum valve 26 is located in the first vacuum plenum 24 and is activatable between an open configuration permitting flow from chamber 22 to vacuum source 28 and a closed configuration preventing flow through the valve 26.

The first outlet chamber 22 also has a first air duct 30 connecting the chamber 22 to atmosphere. A first air valve 32 is located in duct 30 and is activatable between an open configuration permitting flow from atmosphere to chamber 22 and a closed configuration preventing flow through valve 32.

Similarly, a second exitway 21 extends as part of a second conduit system from a second outlet in the chamber 16 and provides an exit from chamber 16 to second outlet chamber 23. A second filter 19 is disposed about the second exitway 21 to require air passing between chambers 16 and 23 to flow through the second filter 19. The second outlet chamber 23 has a second vacuum plenum 25 connecting the chamber 23 to a second vacuum source 29. A second vacuum valve 27 is located in second vacuum plenum 25 and is activatable between an open configuration permitting flow from chamber 23 to vacuum source 29 and a closed configuration preventing flow through the valve 27.

The second outlet chamber 23 also has a second air duct 31 connecting chamber 23 to atmosphere. A second air valve 33 is located in duct 31 and is activatable between an open configuration permitting flow from atmosphere to chamber 23 and a closed configuration preventing flow through valve 33.

In a normal filtering operation while paint powder is being sprayed in the paint booth, inlet valve 12 is open; both vacuum valves 26 and 27 are open; both air valves 32 and 33 are closed and both vacuum sources 28 and 29 are operative to draw air from the atmosphere successively through opening 9, chamber 10, inletway 14, chamber 16, and then simultaneously either through filter 18, exitway 20, chamber 22 and vacuum plenum 24 or through filter 19, exitway 21, chamber 23 and vacuum plenum 25.

To assist in cleaning the filters, the apparatus is configured to be operated in two backflow configurations. In a first backflow configuration, for backflow through the first filter 18, inlet valve 12 is closed, first vacuum valve 26 is closed and first air valve 32 is open. With the second air valve 33 closed, the second vacuum valve 27 open and the second vacuum source 29 operating, air is drawn in succession to pass through first air duct 30, first chamber 22, exitway 20, filter 18, chamber 16, filter 19, exitway 21, second chamber 23 and second vacuum plenum 25 to the second vacuum source 29. In this first backflow configuration, air is drawn backwards through filter 18 to assist in dislodging powder in filter 18 and to let it drop with gravity into powder collection hopper portion 17 of chamber 16. A baffle 15 is provided between first filter 18 and second filter 19 to require substantially all backflow air to pass downwardly under the baffle which is advantageous to assist in reducing powder discharged from first filter 18 being entrained in the air and passing with the air to the second filter 19.

In a second backflow configuration, for backflow through the second filter 19, inlet valve 12 is closed, second vacuum valve 27 is closed and second air valve 33 is open. With the first air valve 32 closed, the first vacuum valve 26 open and the first vacuum source 28 operating, air is drawn in succession to pass through second air duct 31, second chamber 23, exitway 21, filter 19, chamber 16, filter 18, exitway 20, first chamber 22 and first vacuum plenum 24 to the first vacuum source 28. In the second backflow configuration, air is drawn backwards through filter 19 to assist in dislodging powder in filter 19 and to let it drop with gravity into the powder collection hopper portion 17 of chamber 16.

The present invention provides a method of operating a filtering apparatus by cycling the apparatus through the normal filtering configuration, the first backflow configuration and the second backflow configuration as may be accomplished by suitable manipulations of the valves and operation of the vacuum sources which preferably comprise air discharge fans. More preferably the apparatus is cycled through the normal filtering configuration, the first backflow configuration and the second backflow configuration without interrupting the operation of the vacuum sources.

Reference is now made to FIGS. 2 to 13 which schematically show a preferred second embodiment of a modular paint booth filtering system in accordance with the present invention. In all the figures, similar reference numerals refer to similar elements.

Figure 2:
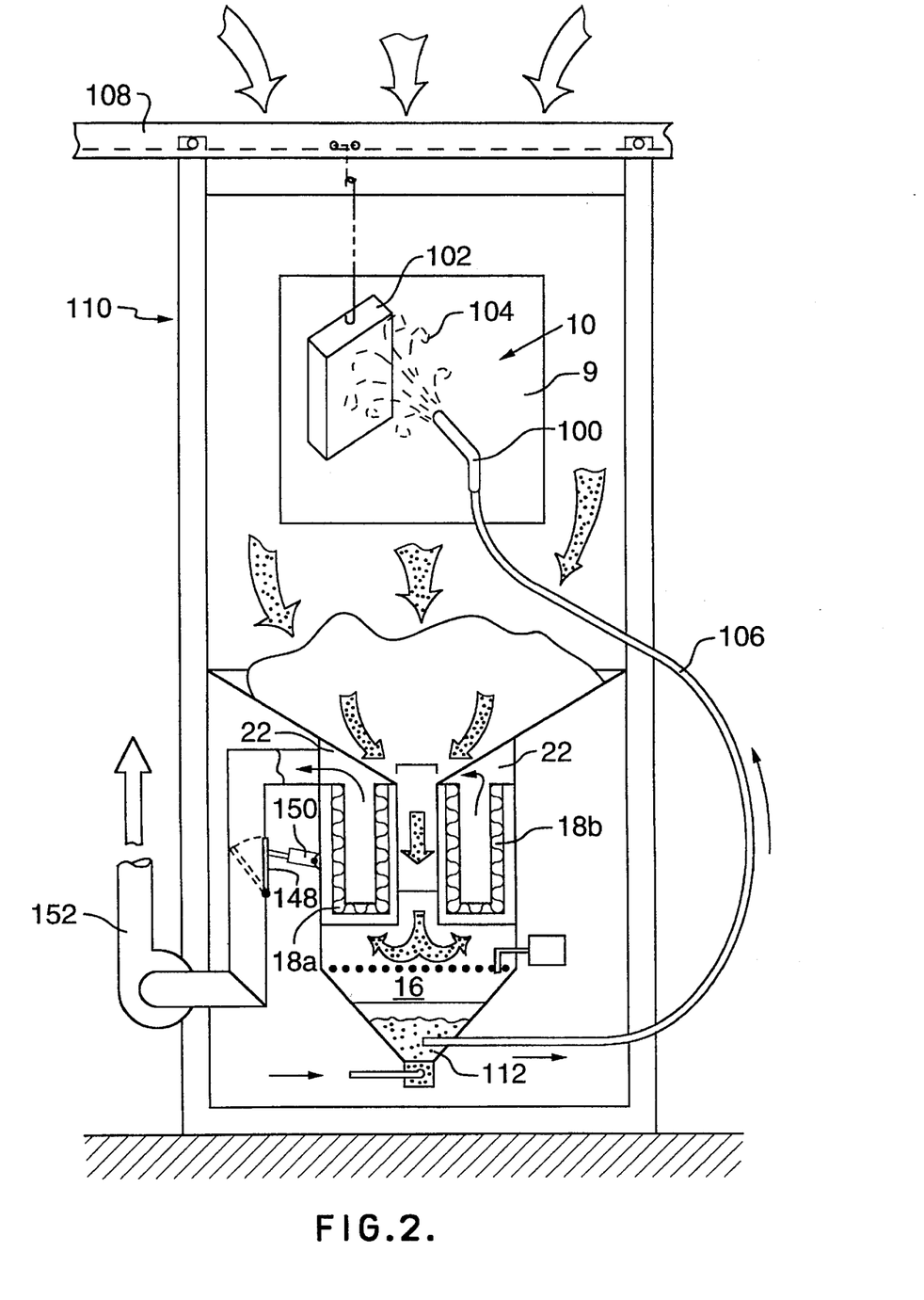
FIG. 2 is a schematic front view, partially sectioned of a filtering apparatus in accordance with a second embodiment of the present invention.

FIG. 2 shows a modular paint booth 110 adapted to be movable on overhead rails 108 in a manner similar to that described in co-pending Canadian Patent Application Serial No. 2,103,329 filed Nov. 17, 1993 of the same inventors entitled Modular Shuttle Conveyor, the disclosure of which is incorporated herein by reference. Preferably, an article 102 to be painted is suspended by via hooks and may also be movable on overhead rails 108 as disclosed in above Canadian Patent Application Serial No. 2,103,329. The modular paint booth 110 includes paint booth or housing chamber 10 with opening 9 through which paint powder 104 may be sprayed using spray gun 100. As indicated by the arrows in FIG. 2, over-spray is drawn with air down into the collection or intake chamber 16 and through filters 18a, 18b from which paint powder may be discharged to be collected in a lower portion paint collection hopper portion 17 illustrated to comprise a fluidized bed 112 of paint particles. By known means, the paint powder is pumped from the fluidized bed 112 via a hose 106 to the spray paint gun for re-spraying.

Figure 3:
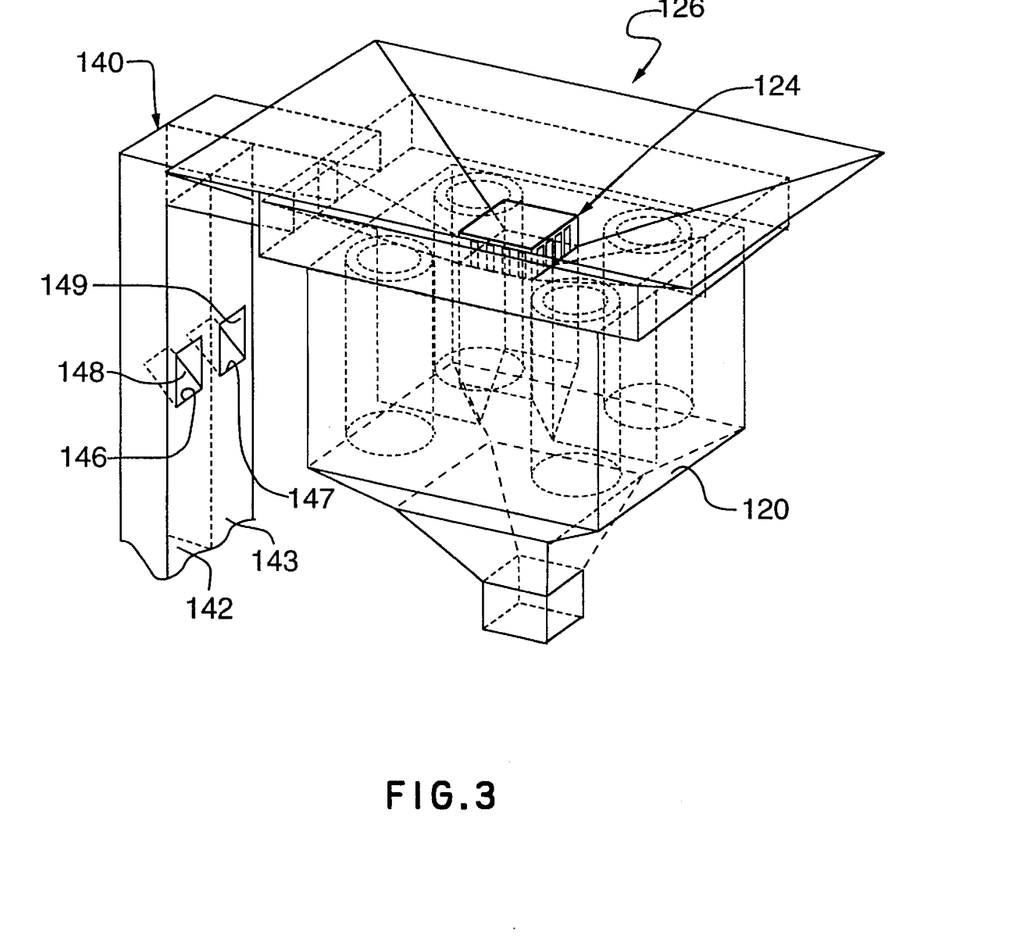
FIG. 3 is a perspective view showing a portion of the apparatus of FIG. 2 comprising a structure forming the bottom of the paint booth chamber, intake chambers, output chambers and plenum.
Figure 4:
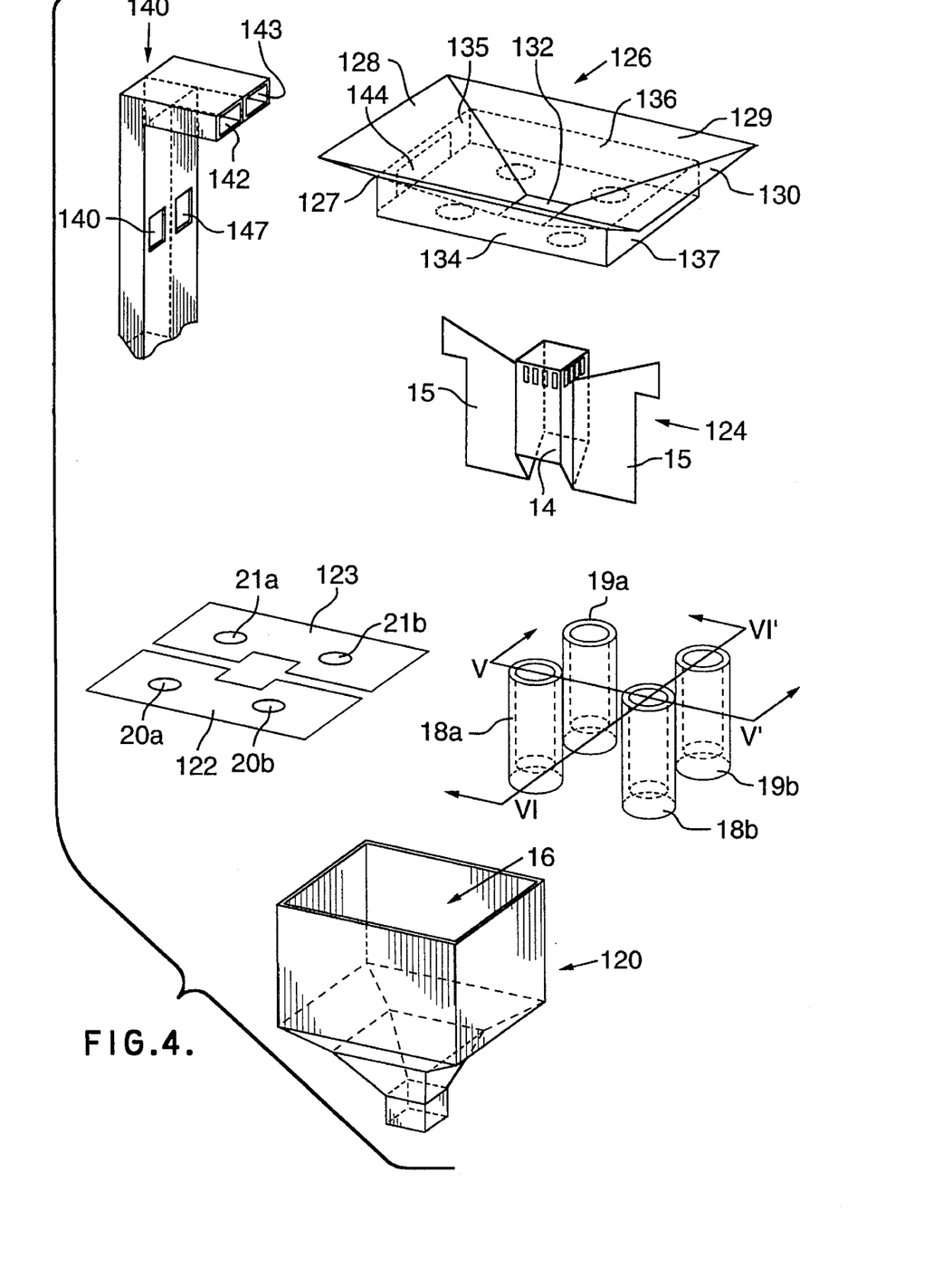
FIG. 4 is a schematic exploded view showing elements comprising the structure shown in FIG. 3.

Construction of the filtering apparatus is best understood with reference to FIGS. 2 and 3. FIG. 3 shows an assembled view of a portion of the apparatus with interior portions roughly illustrated in dotted lines. FIG. 4 shows a schematic exploded view of principle elements shown in FIG. 3. Referring to FIG. 4, the intake chamber 16 is formed as a square sheet-metal funnel-like member 120. A top wall to the chamber 16 is formed by first top plate 122 and second top plate 123 with first exitways 20a and 20b and second exit ways 21a and 21b extending from outlets therethrough. Open ended cylindrical first filters 18a and 18b and second filters 19a and 19b are secured to the undersides of top plates 122 and 123, respectively, about the ends of exitways 20a, 20b, 21a and 21b to locate the filters hanging within chamber 16.

Sheet-metal centre divider 124 defines the inletway 14 between chamber 10 and chamber 16 as a vertical tube of square cross-section. As well, centre divider 124 provides the baffle 15 extending vertically downward between plates 122 and 123 on either side of the inletway 14. The baffle 15 advantageously acts to deflect air which backflows into the chamber 16 downwardly towards the collection hopper portion 17.

Hopper section 126 is shown with four planar top panels 127, 128, 129 and 130 sloping down to a central opening 132 and with vertically downwardly extending depending sidewall panels 134, 135, 136 and 137 which are sized to engage the periphery of horizontal top plates 122 and 123.

First outlet chamber 22 is defined between top plate 122, divider 124, top panel 127, side panel 134 and the front halves of panels 128, 130, 135 and 137.

Second outlet chamber 23 is defined between top plate 123, divider 124, top panel 129, side panel 136 and the rear half of panels 128, 130, 135 and 137.

Double plenum 140 has a first plenum 142 defined as its forward half and a separate second plenum 143 or its rear half. The double plenum 140 is coupled to a complimentary exit opening 144 in side panel 135 such that the first plenum 142 communicates with first outlet chamber 22 and the second plenum 143 communicates with the second output chamber 23. Each plenum 142 and 143 has an opening 146 and 147, respectively, open to atmosphere and closable by separate flapper valves 148 and 149 best seen in FIG. 3. Each flapper valve 148 and 149 is operated by a separate valve control device 150 only one of which is shown in FIG. 2 so as to be movable between two positions, namely, a vacuum position as shown in solid lines in FIGS. 2 and 3 and an air position shown in dotted lines in FIGS. 2 and 3. In the "vacuum position", the valve 148 closes its opening 146 and permits the fan 152 to draw air from first output chamber 22 via first plenum 142. In the "air position", the valve 148 closes its first plenum 142 between its opening 146 and the fan 152 and permits outside air to flow into opening 146 and via the first plenum 142 to the first outlet chamber 22. Operation of the valve 149 on the second plenum 143 is the same.

Preferably, only one air fan 152 is provided to draw air and create the partial vacuum with this one air fan 152 connected to the outlets of both the first plenum 142 and the second plenum 143.

Figure 5:
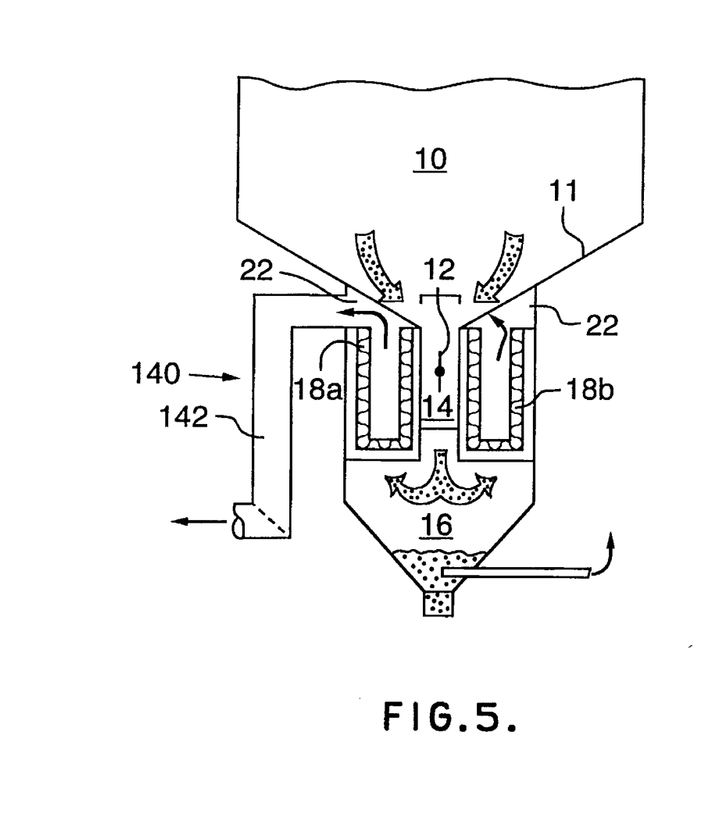
Figure 6:
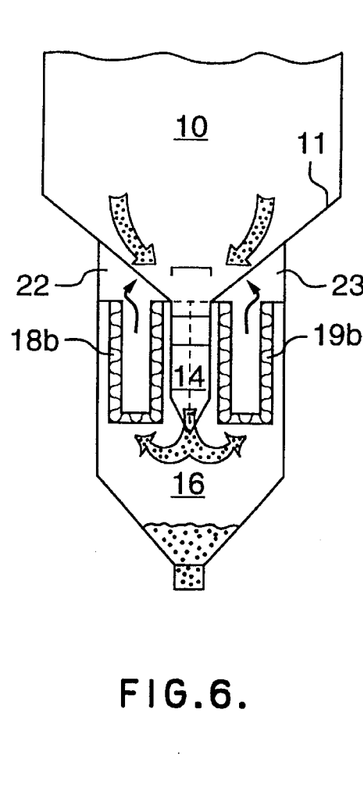
FIG. 6 represents a schematic cross-sectional view through the filters along section line VI—VI' in FIG. 4.
Figure 7:
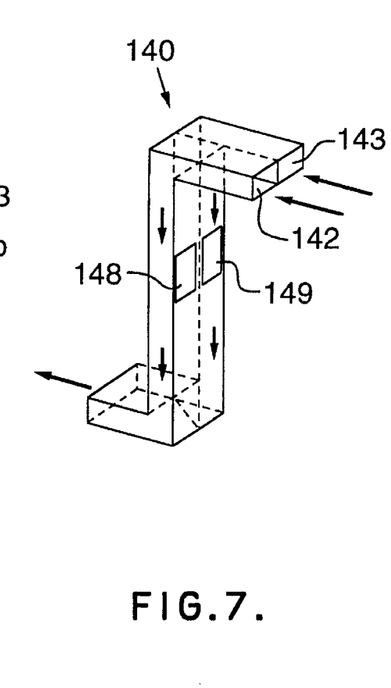
FIG. 7 represents a schematic illustration of the double plenum showing air flow.
Figure 8:
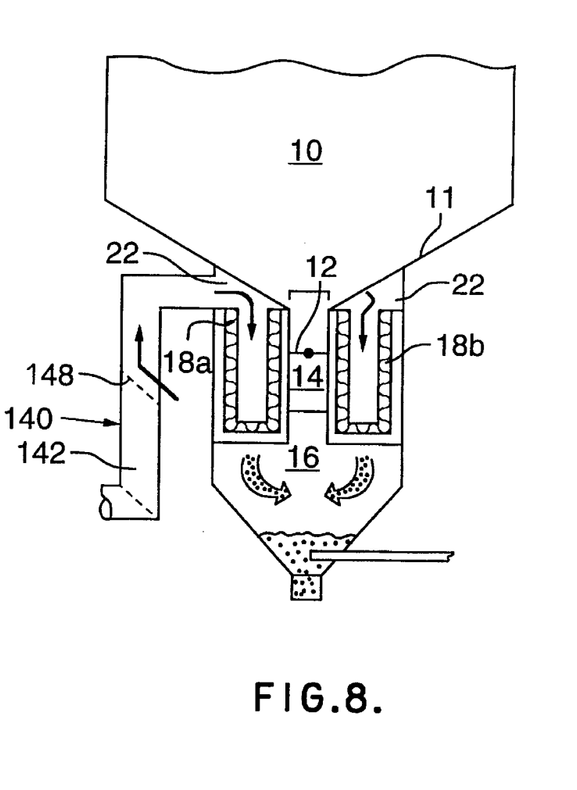
FIGS. 8, 9 and 10 are views similar to FIGS. 5, 6 and 7, respectively however showing the system operating in a first backflow configuration.
Figure 9:
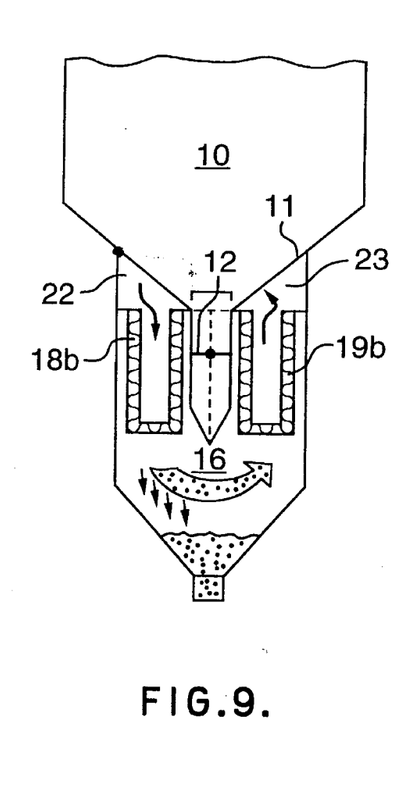
Figure 10:
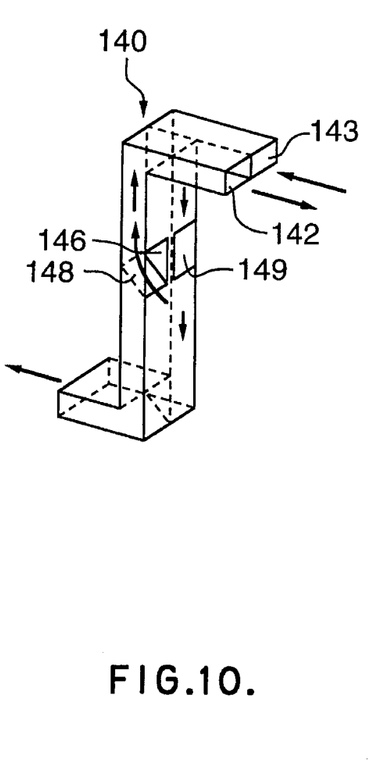
Figure 11:
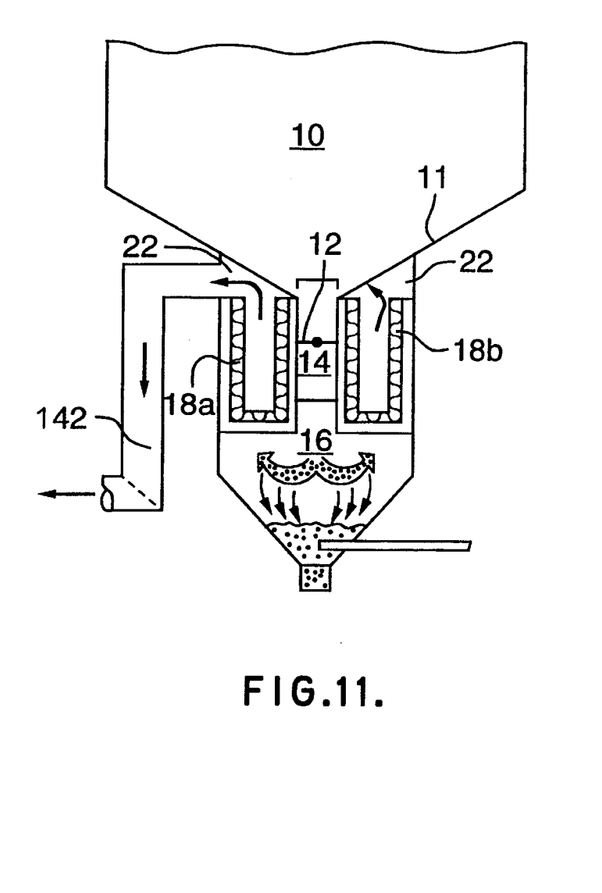
FIGS. 11, 12 and 13 are Figures similar to FIGS. 5, 6 and 7, respectively but showing the system in a second backflow configuration.
Figure 12:
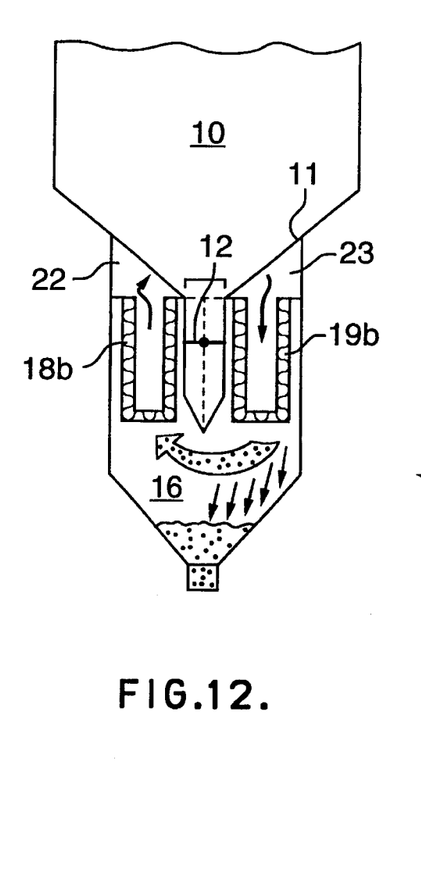
Figure 13:
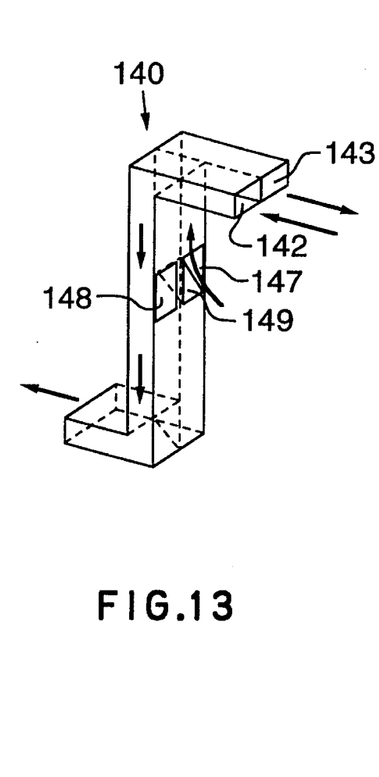

Operation of the system of FIGS. 2 to 4 is now briefly described with reference to FIGS. 5 to 13. FIGS. 5 to 7 illustrate a normal filtering configuration. FIGS. 8 to 10 illustrate a first backflow configuration. FIGS. 11 to 13 illustrate a second backflow configuration.

FIGS. 5, 8 and 7 illustrate a sectional view along line V—V' in FIG. 4 through the centres of both first filters 18a and 18b and through the first plenum 142. FIGS. 6, 9 and 11 illustrate a sectional view along line VI–VI' in FIG. 4 through the first filter 18b and the second filter 19b. In FIGS. 5, 6 and 7, inlet valve 12 is open, both flapper valves 148 and 148 are in the vacuum position and air is drawn from chamber 10 in succession through inletway 14, chamber 16 and either through filter 18a or 18b, chamber 22 and plenum 142 or through filters 19a or 19b, chamber 23 and plenum 143 to fan 152.

In FIGS. 8, 9 and 10, inlet valve 12 is closed, flapper valve 148 is in the air position and flapper 149 is in the vacuum position. The fan 152 draws air in opening 146 and in succession through plenum 142, chamber 22, exitway 20, one of first filter 18a or 18b, chamber 16, one of second filters 19a or 19b, exitway 21, chamber 23 and plenum 143 to fan 152. In this configuration, there is backflow through first filters 18a and 18b.

In FIGS. 11, 12 and 13, inlet valve 12 is closed, flapper 148 is in the vacuum position and flapper 149 is in the air position. The fan 152 draws air in opening 147 and in succession through plenum 143, chamber 23, exitway 21, one of second filters 19a and 19b, chamber 16, one of first filters 18a and 18b, exitway 22, chamber 22 and plenum 142 to fan 152.

Preferably, each modular paint booth 110 as illustrated in FIG. 2 has its own fan 152 and the unit is totally portable for use in any station merely by electrical connection. The preferred construction of the second embodiment provides a compact and light weight construction readily adapted for use in relatively small modular paint booths.

Figure 14:
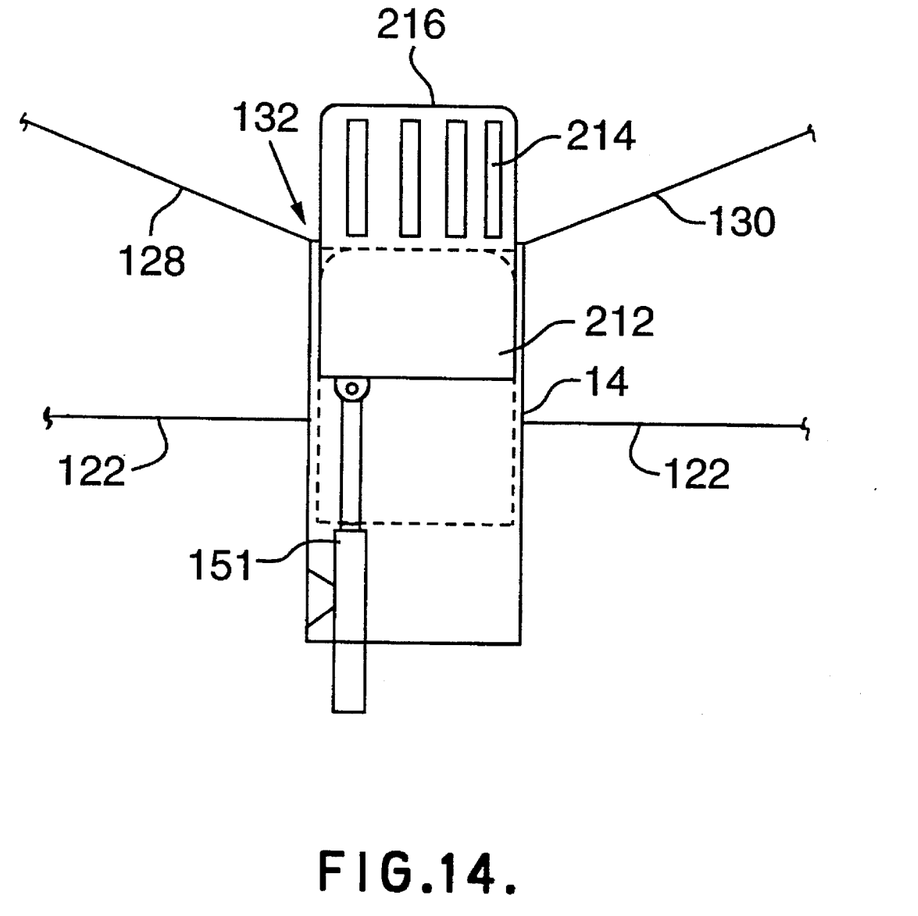
FIG. 14 is a schematic partially sectioned side view of a poppet valve preferred for use as alternate inlet valve to that shown in the embodiment of FIGS. 2 to 13.

The embodiments of FIGS. 1 and 2 show inlet valve 12 as a damper-like flap. A more preferred valve comprises a poppet type valve as shown in FIG. 14. FIG. 14 shows a partially cross sectioned side view of the inletway 14 of FIGS. 2 to 13 but with the flap valve replaced by poppet-like valve 212 which is vertically slidable within inletway 14 between an open position shown in solid lines and a closed position shown in dotted lines. In the open position, the valve 212 extends above the central opening 132 with vents 214 in the sides of the valve 212 permitting air flow through valve 212 into inletway 14. The top of valve 212 is a closed top plate 216 such that when the valve 214 is in the closed position, retracted down into inletway 14, the top plate 216 in effect closes the opening 132 preventing air flow. For fire prevention, for example, valve 212 preferably when closed will provide a substantially air tight seal with inletway 14. When chamber 16 is under vacuum conditions valve 212 has an inherent tendency to move to the closed position.

A valve control device 151 is shown to move the valve 215 between open and closed positions. Preferably the control device 151 is a hydraulic or pneumatic cylinder.

The flapper valves 148 and 149 shown in FIGS. 2 and 3 are particularly preferred in that when moved to the vacuum position to close their plenum, the vacuum from fan 152 draws the flapper valve across the plenum and thereby holds the flapper valve in the vacuum configuration. Preferably each flapper valve is configured to cooperate with its plenum or a seat provided in the plenum to provide an air tight seal when in the vacuum configuration. Preferably a cylinder arrangement whether hydraulic or pneumatic is used as the valve control device 150.

In the event of fire in the paint booth system, a fire and/or heat sensing device is provided to automatically move or let move both valves 148 and 149 to the vacuum configuration and preferably at the same time to close inletway 14 as by drawing poppet-like valve 212 of FIG. 14 to the closed condition. This can stop all air flow almost instantly and assist in isolation of any fire, particularly since each has an inherent tendency under vacuum to move to the desired closed configuration.

The filtering apparatus of the present invention is particularly adapted to be used in a manner which permits frequent cleaning of the filters by backflow for short periods of time. In this regard a method of use of the filtering apparatus is now described with reference to a modular paint booth of the type described in Canadian Patent Application 2,103,329 in which articles to be painted are moved into and out of the paint booth on a conveyor by being carried on an individual conveyor car. In such a system preferably a batch of one or more articles is moved into the paint booth, held in the paint booth for painting then moved out of the paint booth while the next batch is moved into the paint booth. As an example the residence time in the booth maybe 30 seconds to 5 minutes while the time to change batches when spraying is not carried out is 10 seconds to 1 minute.

The present filtering apparatus may advantageously be placed into the backflow configurations every time the batches are changed and thus for example with great frequency and after only a relatively short time of spraying. Increasing the frequency of backflow cleaning reduces the amount of paint powder on the filters making cleaning easier. As well it reduces the pressure drop across the filters letting the fan 152 have a smaller size and capacity. For example small fans of for example mere 4 kw power requirement can advantageously be used.

The apparatus is preferably controlled so that in normal operation fan 152 is continuously operated during the cycle in succession from the normal filtering configuration to the 1st backflow configuration to the 2nd backflow configuration then returning to normal filter configuration. With the apparatus in the normal filtering configuration of FIGS. 5, 6 and 7, merely by closing inlet valve 12 and moving valve 148 to the air position, the apparatus is almost instantly switched to the 1st backflow configuration. Subsequently by merely moving valve 148 to the vacuum position and simultaneously moving valve 149 to the air position, the apparatus is almost instantly switched to the 2nd backflow configuration. Subsequently by merely opening inlet valve 12 and moving valve 149 to the vacuum position and opening valve 12 the apparatus is almost instantly returned to the normal filtering configuration.

In that fan 152 is continuously operating simple control of the valves 12, 148 and 149 permits low energy cost and easy switching between configurations of the apparatus, particularly when all three valves are controlled by hydraulic or pneumatic piston-cylinder controls.

Prompt switching from a normal filtering configuration to a 1st backflow configuration then rapidly switching from the 2nd backflow configuration is advantageous in so far as the dynamic energy of the air flow through the system assists in creating good backflow conditions. As well the fan 152 in one of the backflow configurations draws all air from only one plenum 142 or 143 and not from both plenums 142 and 143 in normal filtering thus assisting in establishing good backflow.

In a preferred operation it has been found that maintaining a 1st backflow configuration for about 10 to 15 seconds followed by a 2nd backflow configuration for about 10 to 15 seconds provides excellent filter cleaning when repeated between each successive relative short spraying session of for example 1 minute to 5 minutes.

The time required to switch from one configuration to another is assisted particularly with the use of flapper valves 148 and 149 and poppet valve 212 in that each of these has when the fan is operating an inherent bias to move to the air position for the flapper valves 148 and 149 and to move to the closed position for valve 212. Prompt switching to the backflow configurations assisted by the inherent system dynamics and existing vacuum conditions assists fast cycling between filtering and backflow configurations and assists good backflow for filter cleaning.

While the first embodiment of the invention discloses the use of air ducts 30,31 to communicate the collection chamber 16 directly to the atmosphere, the invention is not so limited. Other gas sources could equally be provided depending on the application of the apparatus and will now become apparent.

While the preferred embodiments of the invention disclose the use of the apparatus for use in filter powder paint, it is to be appreciated that the invention is not so limited and may equally be used to filter other particulate matter entrained in gases.

Although the disclosure describes and illustrates a preferred embodiments of the invention, it is to be understood that the invention is not restricted to these particular embodiments. Rather, the invention includes all embodiments which are functional and mechanical equivalents of the specific embodiments and features that have been described and illustrated herein. Further modifications and improvements will occur to persons skilled in the art. For a definition of the invention, reference is made to the following claims.

We claim:

1. An apparatus for depositing particulate matter on an article comprising, housing chamber means for housing said article while said particulate matter is deposited thereon, collection chamber means for collecting excess particulate matter entrained in gas, the collection chamber means including first outlet means, and second outlet means, inletway means providing gaseous communication between said housing chamber and said collection chamber means, inlet valve means operable to assume an open position permitting gas flow from said housing chamber means through said inletway means into the collection chamber means, and a closed position closing said inletway means, vacuum means for evacuating said collection chamber means to a negative pressure, particulate matter filtration means comprising first filter means across said first outlet means and second filter means across said second outlet means, first conduit means including first conduit valve means operable to selectively connect the first outlet means to either:
(a) said vacuum means, whereby said vacuum means draws gas outwardly from said collection chamber means through said first filter means via said first outlet means, or
(b) a first source of gas at a pressure above pressure drawn by said vacuum means, whereby the first conduit means permits gas from the first source of gas to backflow into the collection chamber means through the first filter means via said first outlet means, second conduit means including second conduit valve means operable to selectively connect the second outlet means to either:
(a) said vacuum means, whereby said vacuum means draws gas outwardly from said collection chamber means through the second filter means via the second outlet means, or
(b) a second source of gas at a pressure above pressure drawn by the vacuum means, whereby the second conduit means permits gas from the second source of gas to backflow into the collection chamber means through the second filter means via said second outlet means.

2. An apparatus as claimed in claim 1 wherein with said inlet valve means open and both said first conduit means and said second conduit means connected to said vacuum means, gas is drawn into the collection chamber means from the housing means via the inletway means and through the first filter means or second filter means to exit the collection chamber means with the particulate matter entrained in gas entering the collection chamber means and being retained in the collection chamber means by the first filter means or second filter means, and wherein with said inlet valve means closed when said first conduit means is connected to the vacuum means and the second conduit means is connected to the second source of gas, gas from the second source of gas backflow through the second filter means to dislodge particulate matter from the second filter means into the collection chamber means, and gas within the collection chamber means is drawn outwardly through the first filter means retaining in the collection chamber means the particulate matter entrained in gas passing therethrough, and when said second conduit means is connected the vacuum means and the first conduit means is connected to the first source of gas, gas from the first source of gas backflows through the first filter means to dislodge particulate matter from the first filter means into the collection chamber means, and gas within the collection chamber means is drawn outwardly through the second filter means retaining in the collection chamber means the particulate matter entrained in gas passing therethrough.

3. An apparatus as claimed in claim 1 wherein said particular matter is powder paint, said housing chamber means comprises a powder paint booth, and said collection chamber means comprises a powder paint collection chamber.

4. An apparatus as claimed in claim 1 wherein said housing chamber means is in communication with a third source of gas at a pressure above pressure drawn by the vacuum means.

5. An apparatus as claimed in claim 4 wherein said first source of gas, said second source of gas and said third source of gas each comprise a source of air at atmospheric pressure.

6. An apparatus as claimed in claim 1 wherein said first source of gas and said second source of gas each comprise a source of air at atmospheric pressure, said first conduit means comprising, first output chamber means, first exitway means connecting the first output chamber means to the first outlet means, first vacuum plenum means connecting the first output chamber means to the vacuum means, and first air duct means connecting the first output chamber to the source of air, the first conduit valve means including first vacuum valve means and first pressure valve means, the first vacuum valve means operable to permit or prevent flow from the first output chamber means to the vacuum means, and the first pressure valve means operable to permit or prevent flow from the first output chamber to the source of air, said second conduit means comprising, second output chamber means, second exitway means connecting the second output chamber means to the second outlet means, second vacuum plenum means connecting the second output chamber means to the vacuum means, and second air duct means connecting the second output chamber to the source of air, the second conduit valve means including second vacuum valve means and second pressure valve means, the second vacuum valve means operable to permit or prevent flow from the second output chamber means to the vacuum means, and the second pressure valve means operable to permit or prevent flow from the second output chamber to the source of air.

7. An apparatus as claimed in claim 3 wherein said inlet valve means comprises a poppet valve.

8. An apparatus as claimed in claim 1 wherein said first conduit valve means comprises a first flapper valve having an inherent tendency to assume a position whereby the first outlet means is connected to said vacuum means, and said second conduit valve means comprises a second flapper valve having an inherent tendency to assume a position whereby the second outlet means is connected to said vacuum means.

9. An apparatus as claimed in claim 1 further including sensing means for sensing heat in said apparatus, and control means for moving said inlet valve means to said closed position when said sensing means senses heat.

10. An apparatus as claimed in claim 9 wherein said control means is activatable to move said first conduit valve means to connect said first outlet means to said vacuum means, and said second conduit means to connect the second outlet means to said vacuum means, when said sensing means senses said heat.

11. An apparatus as claimed in claim 10 wherein when the inlet valve means is moved to said closed position, the inlet valve means is disposed within the inletway means and closes said inletway means in a substantially air tight seal.

12. An apparatus for electrostatically depositing powder on an article therein and for recovering surplus powder comprising:

housing chamber means for housing said article, and having a lower hopper section, collection chamber means for collecting said surplus powder and including an upper chamber portion opening downwardly into a lower chamber portion, first outlet means, and second outlet means, the lower hopper portion of the collection chamber means located under the lower hopper section of the housing chamber means, and the collection chamber means in communication with the housing chamber means by an inletway means providing communication downwardly from the lower hopper section of the housing chamber means into the collection chamber means, the inletway means communicating with the collection chamber means such that powder passing through the inletway means which is not entrained by moving air drops under gravity from the inletway means into the lower hopper portion of the collection chamber means, inlet valve means operable to either permit or prevent air and said powder to flow from the housing chamber means through the inletway means into the collection chamber means, vacuum conduit means for connection to vacuum means for evacuating said collection chamber means to a negative pressure, powder filtration means comprising first filter means across said first outlet means and second filter means across said second outlet means, first conduit means including first conduit valve means operable to selectively connect the first outlet means to either:
(a) said vacuum conduit means, whereby said vacuum means draws air outwardly from said collection chamber means through said first filter means via said first outlet means and powder entrained by said air is retained on said first filter means, or
(b) a source of air at a pressure above pressure drawn by said vacuum means, whereby the first conduit means permits air to backflow into the collection chamber means through the first filter means via said first outlet means to dislodge powder retained on said first filter means, second conduit means including second conduit valve means operable to selectively connect the second outlet means to either:
(a) said vacuum conduit means, whereby said vacuum means draws air outwardly from said collection chamber means through the second filter means via the second outlet means and powder entrained by said air is retained on said second filter means, or
(b) a source of air at a pressure above pressure drawn by the vacuum means, whereby the second conduit means permits air to backflow into the collection chamber.

13. An apparatus as claimed in claim 12 further including baffle means extending vertically in the collection chamber means between the first filter means and the second filter means, said baffle means positioned to deflect air which backflows into the collection chamber means downwardly towards the lower chamber portion.

14. An apparatus as claimed in claim 12 wherein said lower chamber portion comprises a powder collection hopper.

15. An apparatus as claimed in claim 12 wherein said inlet valve means comprises a poppet valve.

16. An apparatus as claimed in claim 12 wherein said first conduit valve means comprises a first flapper valve having an inherent tendency to assume a position whereby the first outlet means is connected to said vacuum means, and said second conduit valve means comprises a second flapper valve having an inherent tendency to assume a position whereby the second outlet means is connected to said vacuum means.

17. An apparatus as claimed in claim 12 further including sensing means for sensing heat in said apparatus, and control means for activating said inlet valve means to prevent said air and said powder to flow through said inletway means when said sensing means senses heat.

18. An apparatus as claimed in claim 17 wherein when said sensing means senses heat, said control means automatically moves said first conduit means to connect said first outlet means to said vacuum means, and said second conduit means to said connect said second outlet means to said vacuum means.

19. An apparatus as claimed in claim 16 further including sensing means for sensing heat in said apparatus, and control means for activating said inlet valve means to prevent said air and said powder to flow through said inletway means when said sensing means senses heat.

* * * * *